Feb. 14, 1961 J. W. CLARK 2,971,330
AIR-INLET SHOCK CONTROLLER
Filed July 20, 1959 2 Sheets-Sheet 1
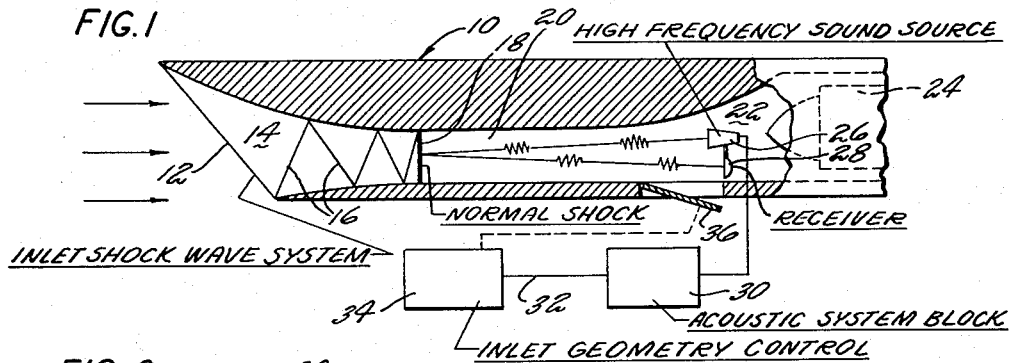
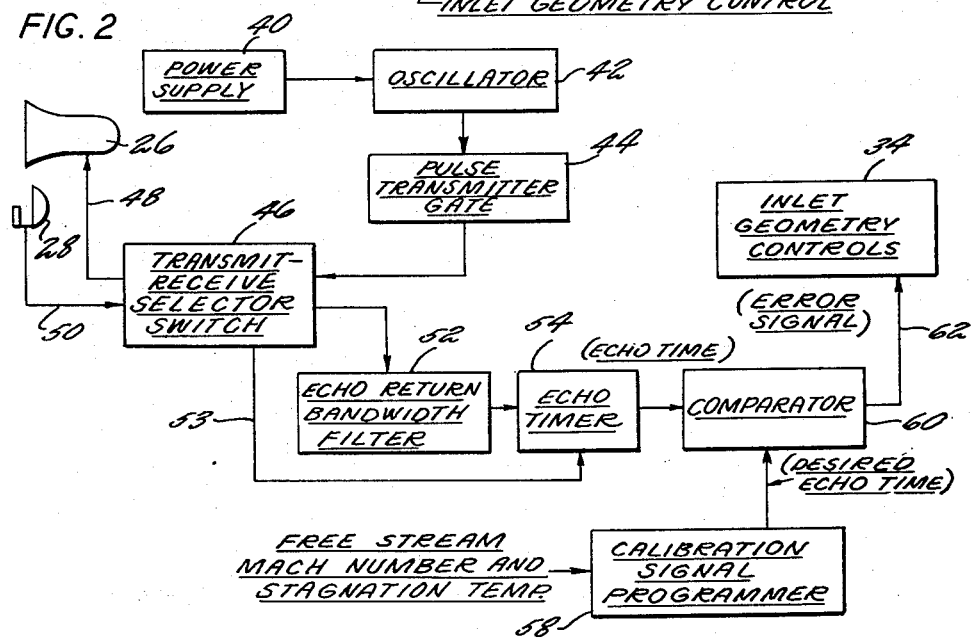
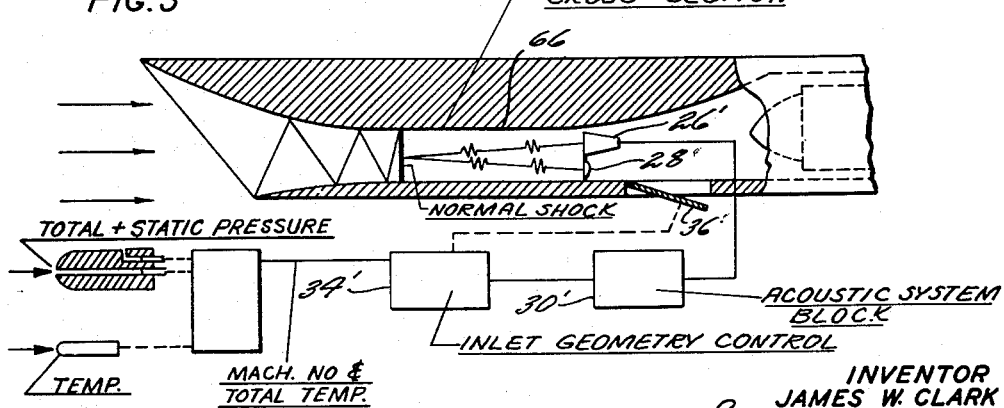
INVENTOR
JAMES W. CLARK
BY *Leonard F. Wakeland*
ATTORNEY Feb. 14, 1961  J. W. CLARK  2,971,330
AIR-INLET SHOCK CONTROLLER
Filed July 20, 1959  2 Sheets-Sheet 2
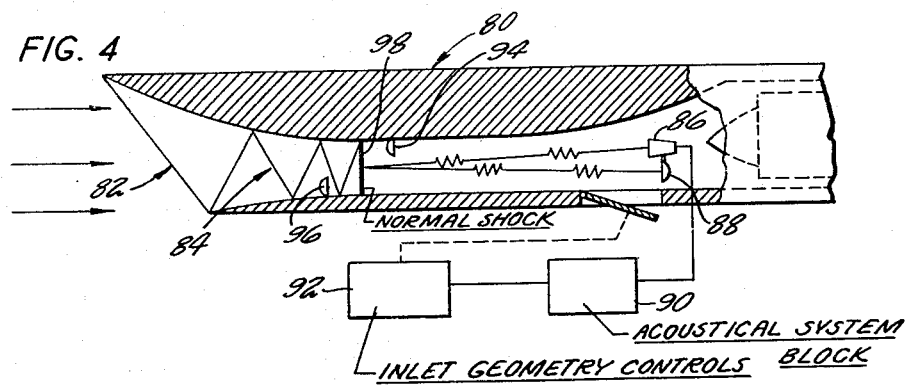
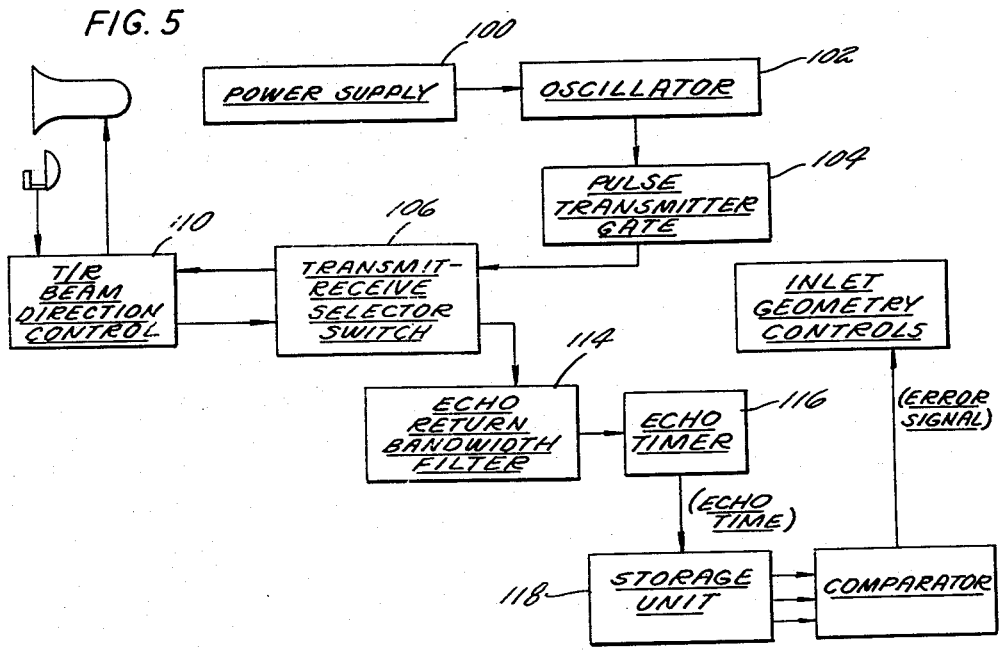
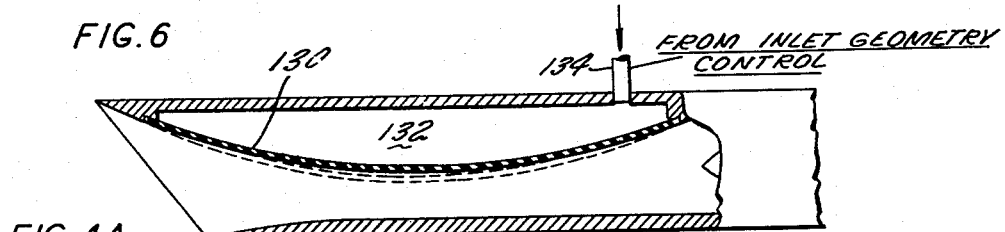
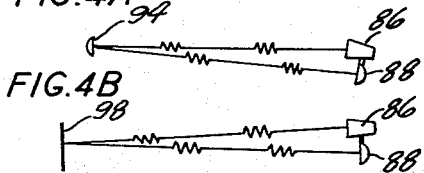
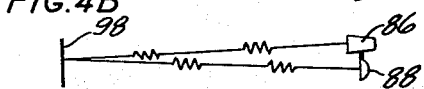
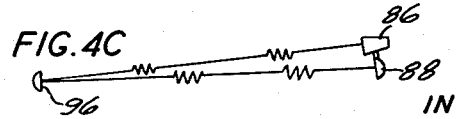
INVENTOR
JAMES W. CLARK
BY *Leonard F. Wickland*
ATTORNEY

# United States Patent Office 2,971,330
Patented Feb. 14, 1961

2,971,330
AIR-INLET SHOCK CONTROLLER

James W. Clark, Glastonbury, Conn., assignor to United Aircraft Corporation, East Hartford, Conn., a corporation of Delaware Filed July 20, 1959, Ser. No. 828,285

13 Claims. (Cl. 60—35.6)

This invention relates to high-speed air inlets for aircraft power plants or the like and more particularly to a high frequency sound shock locator and control system for positioning the shock.

In variable geometry inlets or bypass type inlets, the air flow entering the inlet experiences a number of oblique shock waves followed by a normal shock. Downstream of the normal shock, the air has increased in pressure as a result of passing through the shock and its velocity has been reduced to some subsonic value. The area distribution of the inlet or the amount of bypass may be varied in either instance in order to position the normal shock at or near the throat of the inlet. As a result, it is necessary to know quite accurately the shock location in the inlet after a change in flow conditions.

It is therefore an object of this invention to provide a very accurate highly sensitive and quickly responding device for sensing the position of a shock in a supersonic air inlet and accordingly regulating a parameter of flow in order to maintain the shock in the ideal position.

It is a further object of this invention to utilize a high frequency sound shock wave locator which sends out signals in an upstream direction toward the shock wave in the inlet, and along with a timing mechanism, senses the echoes of the high frequency sound signals to provide a resultant control signal. This resultant control signal may vary the flow through a bypass mechanism or, if desired, it may be used to control the physical geometry of at least one wall of the inlet.

These and other objects of this invention will become readily apparent from the following detailed description of the drawings in which:

Fig. 1 is a schematic in partial cross section indicating one form of high frequency sound shock wave control mechanism;

Fig. 2 is a block diagram illustrating the major elements of the acoustic control system;

Fig. 3 is a schematic in partial cross section similar to Fig. 1 but including a constant or nearly constant cross section throat region;

Fig. 4 is a modification of Figs. 1 and 3 utilizing spaced reflective devices;

Figs. 4a, 4b and 4c schematically illustrate the positions of the transmitter-receiver of Fig. 4;

Fig. 5 is a block diagram of the acoustic control system utilized for Fig. 4; and Fig. 6 is a schematic cross section illustrating a variable geometry arrangement for the inlet.

Referring to Fig. 1, a typical supersonic air inlet is generally indicated at 10 as having an upstream opening 12 and a converging duct portion 14 in which are normally located a plurality of oblique shock waves 16 which terminate in a normal shock 18. A shock 18 is preferably located in the upstream end of the minimum area or throat portion 20 of the inlet duct. The inlet duct has a diverging portion 22 at its downstream end for conducting air to an air-breathing power plant 24.

In accordance with this invention, a high frequency sound source or generator 26 is provided which directs the sound signal in an upstream direction toward the position of the normal shock 18. The normal shock 18 presents itself as a reflector to the sound waves which impinge thereagainst such that there is formed an echo traveling in a downstream direction. The echo is received or sensed by a receiver 28. The sound generator 26 sends out intermittent signals which are then echoed back to the receiver. The signal generator and the receiver both send their signals to the acoustic system shown by the block 30 which then sends a resultant signal via the line 32 to the inlet geometry control 34 which may in turn control the opening of a bypass door 36 or actually vary the physical geometry of the inlet by a device, for example, shown in Fig. 6. The geometry controls may be any form of servo device whether hydraulic or electrical which will receive the signal by the line 32 from the acoustic system controller 30.

Referring to Fig. 2, the acoustic system controller comprises a power supply 40 which feeds an oscillator 42 which in turn is connected to a pulse transmitter gate 44. The pulse transmitter gate is a form of timed interrupter which permits the oscillating signal to be transmitted for a predetermined interval and is then interrupted for a length of time sufficient for the receiver 28 to sense the echo of the particular signal. The function just described is performed by the transmitter-receiver selector switch 46; thus the high frequency sound signal of a predetermined frequency and of a given pulse is transmitted by the line 48 to the sound generator or transmitter 26 and at the same time the echo timer 54 is signaled through the line 53 to start the timing cycle. The echo of the transmitted signal is received by the receiver 28 and transmitted via the line 50 to the transmitter-receiver selector switch 46. It might be added that the transmitter-receiver combination can be a siren or whistle or an electrical loudspeaker type device in combination with a microphone or crystal.

In sensing the echo, there will be a small Doppler frequency shift so it is necessary to receive and scan a bandwidth rather than a discrete frequency. Hence, a bandwidth filter 52 is provided along with the echo timer 54.

Since the local speed of sound changes along the duct axis, the signal received by the echo timer alone will not be an exact measurement of the shock position. Therefore, it is necessary to obtain measurements of free stream Mach number and stagnation or inlet air temperature. These measurements may be obtained by any one of a number of conventional means and fed to a calibration signal programmer 58. This supplies a signal or a reference which in effect states the desired echo time which corresponds to the normal shock location for optimum engine performance at that Mach number and temperature. This signal is fed to the comparator 60 which determines the difference between desired echo time and measured echo time and which in turn provides a resultant signal via the line 62 to the inlet geometry control 34.

In order to increase the accuracy of the control described in connection with Figs. 1 and 2, it may be desirable, as shown in Fig. 3, to provide a throat portion 66 in the inlet which is of constant or nearly constant cross section over a predetermined axial length. In other words, the duct may be slightly divergent to provide a region of constant velocity in spite of boundary layer growth. In this instance, the transmitter 26' and receiver 28' are located adjacent the aft end of this constant duct area section and these in turn provide signals to the controls 30' and 34'. The acoustic control block 30 and the inlet geometry control block 34 are identical to those described above and it is still necessary to measure free stream Mach number and stagnation temperature or inlet air temperature. This is necessary since although the local speed of sound does not vary much along the length of the duct, the speed of sound within the duct varies with flight conditions. The advantage of this arrangement is that the sound waves do not change speed of propagation appreciably along the duct axis.

A modified arrangement of this invention is shown in Figs. 4 and 5. In this instance, the inlet is generally indicated at 80 as having a forward opening 82 and typical shock pattern 84. A transmitter-receiver combination 86, 88 is provided in the same manner as described in connection with the other figures, likewise are the acoustical system 90 and the inlet geometry control 92. The acoustic system 90 as shown in block diagram in Fig. 5 according to this modification does not need measurement of free stream conditions and no other calibration is necessary. This result is obtained by providing a pair of sound-reflectors 94 and 96 which are spaced along the axis of flow through the inlet in a region in the inlet on either side of where the normal shock is intended to be located and also spaced transversely of that axis.

The pulsed signal from the transmitter 86 is moved in a scanning fashion (see also Figs. 4a, 4b and 4c) such that it is first aimed at the reflector 94 and, after a short pause for receiving the return echo, then down the center or parallel to the axis of the duct to impinge against the shock wave 98, and then aimed downwardly against the reflector 96.

Referring also to Fig. 5, power supply 100 as well as the oscillator 102 and the pulse transmitter gate 104 and the transmitter-receiver selector switch 106 are identical to Fig. 2. However, a transmitter-receiver beam directional control 110 is necessary to alternately direct the transmitter-receiver unit toward the top, center and bottom of the inlet duct so as to impinge against and between the reflectors 94 and 96. As in the previous arrangement, an echo return bandwidth filter 114 and an echo timer 116 are provided. However, a storage unit or memory device 118 is necessary in order to store the various echo times or signals until such echo signals are available for all three directions of impingement of the high frequency sound beam. The comparator then determines the following conditions:

Echo time $_{top}$=Echo time $_{center}$=Echo time $_{bottom}$ $\longrightarrow$ Shock too far back Echo time $_{top}$<Echo time $_{bottom}$<Echo time $_{center}$ $\longrightarrow$ Shock too far forward Echo time $_{top}$<Echo time $_{center}$=Echo time $_{bottom}$ $\longrightarrow$ Shock in "ideal" position (i.e., bracketed by reflectors)

The following elaboration will serve to clarify the sound signal characteristics of each of the modifications of this invention.

The two variations of the invention shown in Figs. 1 and 3 require (1) a measurement of the time it takes for the sound signal to travel upstream, reflect from the normal shock 18 and travel back downstream to the receiver 28, and (2) a knowledge of what this time should be when the normal shock is in the desired location. The methods of operation of these two variations of the invention are described in columns 1 and 2 of the specification.

Referring to Fig. 1, the high frequency sound source 26 and the receiver 28 are shown to be located in a diverging part of the inlet 22. As pointed out in column 2 (lines 43-45) the speed of propagation of sound will vary in the region between the source 26 and the normal shock 18 due to this divergence of the inlet duct. For subsonic aerodynamic flow in a diverging duct (as in the present case, because the flow behind a normal shock is always subsonic) it is a well-known fact that the velocity of the flow $V_f$ decreases and that the speed of propagation of sound in still air $a$ increases in the downstream direction. Hence it is apparent that a sound signal travelling upstream in a diverging duct toward the shock experiences a continually changing "headwind" which impedes its progress; similarly, after reflecting from the shock, the sound signal experiences a continually changing "tailwind." The magnitudes of the headwind and tailwind at each axial location in the duct are dependent on the velocity of the flow $V_f$ and the speed of sound $a$ at that location.

The headwind and tailwind do not compensate each other. This may be shown mathematically; for the simplified case where the duct has a constant area (i.e., does not diverge) the time to travel upstream is $$t_u = \frac{l}{a - V_f}$$

and the time to travel downstream is $$t_d = \frac{l}{a + V_f}$$

where $l$=distance between source-receiver and normal shock. The total time is then $$t = t_u + t_d = \frac{l}{a - V_f} + \frac{l}{a + V_f} = l\frac{[a + V_f + a - V_f]}{a^2 - V_f^2}$$

$$t = \frac{2l}{a\left(1 - \frac{V_f^2}{a^2}\right)}$$

By observing the denominator of this equation it is evident that the total time will be minimum when $V_f=0$. Therefore, it can be concluded that when $V_f$ is not zero, the headwind and tailwind do not compensate each other.

This equation also points out why it is necessary to have a Mach number and stagnation temperature measurement for the variations of the invention shown in Figs. 1 and 3. The distance $l$ between the source-receiver and the normal shock when the latter is in its desired location is known from the design of the inlet. However, the time required for the sound signal to travel the distance has been shown to be dependent upon both $a$ and $V_f$, the local speed of sound and the velocity of the flow through the inlet. In turn, $a$ and $V_f$ are dependent upon the location of the normal shock in the inlet and the external flight conditions. The speed of sound in still air in the inlet is given by $$a = \sqrt{\gamma R T_t}$$

where $\gamma=1.4$, $R$=gas constant for air, and $T_t$ is the static temperature of the flow through the inlet.

The important point is that at a particular flight condition, when the normal shock is in its desired location, $a$ and $V_f$ will have a corresponding particular set of values. Therefore, there will be a corresponding "desired" total time of travel for the sound pulse at each flight condition. This desired total time must be predetermined by wind tunnel or flight tests; that is, a reference or calibration time must be determined and stored in the calibration signal programmer 58.

In order to determine the flight condition at which the aircraft is operating it is necessary to measure two free-stream flow properties. This is commonly accomplished using a Mach meter and stagnation temperature probe mounted on the nose or wing of the aircraft.

The operation of the air-inlet shock controller as depicted in Fig. 1 is discussed above. The inlet geometry controls 34 respond to the error signal 62 from the comparator 60 so as to cause the measured echo time to equal the desired echo time from the calibration signal programmer for the measured free-stream Mach number and temperature. If the measured echo time is longer than the desired time the shock is too far forward; if less, it is too far aft.

The operation of the air-inlet shock controller as depicted in Fig. 3 is the same as in Fig. 1. In this case, the headwind and tailwind are uniform along the duct, since the duct has constant or nearly constant area. However, both $a$ and $V_f$ vary with the flight conditions and the location of the normal shock, as before, and calibration signals must be provided.

The variations of the invention shown in Figs. 4, 5, and 6 do not require Mach number and stagnation temperature reference. Here, the total times of travel of pulses beamed toward the shock and the reflectors are used only for comparison purposes. The pulses are subject to essentially the same headwinds and tailwinds since their paths differ only slightly.

It should be noted that in each of the arrangements shown, a bypass door type control is illustrated. However, as shown in Fig. 6, a variable geometry inlet can be provided which includes a flexible wall portion 130 which has pressure chamber 132 therebehind to vary the position of the wall 130. A suitable servo fluid can be fed via the line 134 from the inlet geometry control to the chamber 132 to accurately control the profile of the flexible wall 130. Thus the normal shock can be ideally positioned in a manner similar to that provided by a bypass door type arrangement.

It will be apparent that as result of this invention a very accurate, highly sensitive and reliable shock positioning and sensing control capable of operation over a wide range of flight conditions has been provided.

Although several embodiments of this invention have been illustrated and described herein, it will be apparent that various changes may be made in the construction and arrangement of the various parts without departing from the scope of the novel concept.

I claim:

1. In a control for a duct having supersonic fluid flow in at least a portion of its length and having a region therein wherein a shock wave may be located, means for varying a parameter of flow in the duct, a signal generator in a downstream subsonic region of flow in said duct for generating a signal traveling upstream toward the shock, reflector means in said region for reflecting said signal as an echo signal moving in a downstream direction, a signal receiver spaced from said signal generator for receiving the reflected echo signals from said reflector means, means generating a control signal in response to the signal received by said receiver, and means responsive to said control signal for varying said parameter varying means.

2. In a control according to claim 1 including comparator means for comparing said generated signal and said echo signal for producing said control signal.

3. In a control according to claim 2 including means responsive to the Mach number of the free stream externally of the duct for modifying said control signal.

4. In a control according to claim 2 including means responsive to a temperature of the fluid for modifying said control signal.

5. In a control according to claim 3 including means responsive to a temperature of the fluid for modifying said control signal.

6. In a control according to claim 5 wherein said signal is a sound signal.

7. In a control according to claim 1 wherein said parameter varying means includes mechanism for varying the internal geometry of the inlet.

8. An air inlet including an upstream inlet opening and a duct extending downstream thereof, said duct having a geometry along the axis thereof whereby a shock wave is generated in a predetermined region of said duct, means for bleeding fluid from said duct at a downstream location, means located downstream of said region for generating a sound signal directed in an upstream direction toward said region, a receiver for receiving the echo of said sound signal as it is reflected from said region, means for comparing said sound signal and said echo signal and producing a resultant signal, and means receiving said resultant signal for varying the amount of flow through said bleeding means.

9. An air inlet according to claim 8 including sound reflector means located in said region.

10. An air inlet according to claim 9 wherein the region where said sound generating means and said reflector means are in a duct section of substantially constant cross section.

11. In a control for a duct having supersonic fluid flow in at least a portion of its length and having a region therein wherein a shock wave may be located, means for bleeding fluid from said duct and located downstream of the shock, a signal generator in a downstream subsonic region of flow in said duct for generating a signal traveling upstream toward the shock, reflector means in the region of the shock for reflecting said signal in a downstream direction depending upon whether the shock is upstream or downstream thereof, a signal receiver for receiving the reflected signals from said reflector, and means generating a control signal in response to the signal received by said receiver and means responsive to said control signal for varying the flow through said bleed means.

12. An air inlet including an upstream inlet opening and a duct extending downstream thereof, said duct having a changing cross section along the axis thereof whereby a shock wave is generated in a predetermined region of said duct, means for bleeding fluid from said duct at a downstream location, means located downstream of said region for generating a sound signal directed in an upstream direction toward said region, a pair of reflectors spaced apart along the axis of the duct and spaced transversely of said duct for the sound signal back in a downstream direction, means for systematically changing the direction of said sound signal so that it scans transversely of said duct axis, a receiver for receiving the echoes of said sound signal as it is reflected from said region thereby producing echo signals which reflect from said reflectors and the shock wave, means for comparing said sound signal and said echo signals and producing a resultant signal, and means receiving said resultant signal for varying the amount of flow through said bleeding means.

13. An air inlet including an upstream inlet opening and a duct extending downstream thereof, said duct having a geometry along the axis thereof whereby a shock wave is generated in a predetermined region of said duct, means for varying a parameter of operation of said duct, means located downstream of said region for generating a signal directed in an upstream direction toward said region, a receiver for receiving the echo of said signal as it is reflected from said region, means for comparing said signal and said echo signal and producing a resultant signal, and means receiving said resultant signal for varying said parameter varying means.

References Cited in the file of this patent

UNITED STATES PATENTS 2,507,121    Sivian ------------------ May 9, 1950

OTHER REFERENCES

"Unsteady Oblique Interaction of a Shock Wave with a Plane Disturbance," by Moore, NACA Report 1165, 1954.

"Engine Intake Controls," by Stack; Flight, vol. 72, No. 2553, of December 27, 1957, pages 1000–1002; published by Thomas Skinner and Co. Ltd., 111 Broadway, New York 6, N.Y.